United States Patent [19]
Hopkins

[11] Patent Number: 5,032,780
[45] Date of Patent: Jul. 16, 1991

[54] PROGRAMMABLE STEPPER MOTOR CONTROLLER

[75] Inventor: Thomas L. R. Hopkins, Scottsdale, Ariz.

[73] Assignee: SGS-Thomson Microelectronics, Inc., Carrollton, Tex.

[21] Appl. No.: 414,699

[22] Filed: Sep. 29, 1989

[51] Int. Cl.$^5$ ............................................. H02P 8/00
[52] U.S. Cl. ................................. 318/696; 318/685; 318/6; 318/603; 377/44
[58] Field of Search ................... 318/696, 685, 6, 603; 377/44

[56] References Cited

U.S. PATENT DOCUMENTS

| | | | |
|---|---|---|---|
| 4,065,074 | 12/1977 | Anderson et al. | 318/6 X |
| 4,330,751 | 5/1982 | Swain | 377/44 |
| 4,506,201 | 3/1985 | Tsuneki | 318/603 |

Primary Examiner—William M. Shoop, Jr.
Assistant Examiner—Saul M. Bergmann
Attorney, Agent, or Firm—Kenneth C. Hill; Richard K. Robinson

[57] ABSTRACT

A motor controller provides a digital monostable circuit which generates a control signal indicating whether a field coil within a motor should be turned on or off. Two registers are provided within the digital monostable to store values indicating a fixed off time and a minimum on time. These registers can be loaded with selected values by a microprocessor or other controller. The stored values are selectively loaded into a counter which, when the field coil current reaches a preselected level, turns the supply to the field coil off for a time corresponding to the off time value, then on again for a period at least as long as the minimum on time value. The values in the off time and minimum on time registers can be changed to suit operating conditions of the system, and the controller can be operated in either PWM or open loop mode.

9 Claims, 2 Drawing Sheets

PROGRAMMABLE STEPPER MOTOR CONTROLLER

BACKGROUND OF THE INVENTION

1. Field of the Invention:

The present invention relates generally to controls for electric motors, and more specifically to a digital electronic controller suitable for use with a stepper motor.

2. Description of the Prior Art:

The construction, control, and use of stepper motors is well known to those skilled in the art. Because of their design, stepper motors are able to accurately position the rotor at multiple known locations. Because of this capability, stepper motors have many uses. For example, they are used to position the platten and print head in electronic typewriters and printers.

Controllers for stepper motors are used to energize the field coil windings in selected sequences to change the position of the armature. Various switching sequences of the different field coil windings are used to give a full step and half step positioning of the armature. Stepper motors can also hold the armature in a fixed position. This is typically referred to as detent mode.

Stepper motors typically have 2 independent field coils, but other numbers may be used. For example, it is known to construct stepper motors having 5 field coils. The number of field coils, and the number of armature pole pairs used, determine the angular separation between each full or half step position. For example, a motor having 50 armature pole pairs and 2 field windings may be positioned at 200 different settings in the full step mode. This corresponds to an angular separation of 1.8°. Controlling this same motor in half step mode gives 400 positions, each 0.9° apart.

A schematic representation of a stepper motor and associated control circuitry is shown in FIG. 1. This system is a typical system containing 2 field coils. An armature 10 is driven and positioned through switching of currents through field coils 12 and 14. Field coil 12 is driven through an H-bridge 16 (described below), and coil 14 is driven through H-bridge 18.

As described below, H-bridges 16, 18 contain transistors which are switched on and off appropriately in order to cause current to flow through the field coils 12, 14 in the desired direction. The H-bridges 16, 18 are controlled by controllers 20, 22 respectively. As will be described below, many controller 20, 22 designs require that the current level through the field coils 12, 14 be known. This current is sensed through sense resistors 24, 26 which are low resistance resistors. Voltages developed across resistors 24, 26 are fed into controllers 20, 22 through signal lines 28, 30 respectively.

A schematic diagram of one H-bridge 16 is shown in FIG. 2. Four transistors 32, 34, 36, 38 are connected to the field coil 12 in an H configuration. The collectors of transistors 32 and 36 are connected to a voltage source $V_s$, and transistors 34 and 38 have their emitters connected to current sense resistor 24. The collectors of transistors 34, 38 and emitters of transistors 32, 36 are connected to the field coil 12. Recirculation diodes 40, 42, 44, 46 are connected in parallel across transistors 32, 34, 36, 38 respectively. It is known to use field effect transistors in place of the bipolar transistors shown in FIG. 2.

In order to cause current to flow from left to right through field coil 12, transistors 32 and 38 are switched on while transistors 34 and 36 are switched off. In order to cause current to flow from right to left through field coil 12, transistors 36 and 34 are turned on while transistors 32 and 38 are turned off. Turning off all four transistors, or at least the upper pair 32, 36 the lower pair 34, 38, cuts off the current supply to the field coil 12. Because energy is stored in the magnetic field of the coil 12, current does not cease flowing instantaneously but decays according to an L/R time constant as known in the art. Recirculation diodes 40, 42, 44, 46 allow current to circulate through a complete path when the transistors are in the OFF state and the magnetic field of the field coil 12 is collapsing, providing protection to the transistors 32-38.

In order to improve stepper motor performance, many controller designs apply a higher voltage to the motor than the field coils 12, 14 are nominally rated for. For example, a 5 volt, 1 amp motor presents a coil resistance of 5 ohms. In order to improve response time of the stepper, 48 volts could be applied as the source voltage $V_s$. Since currents change in the coils according to L/R time constants, as known in the art, the use of a higher voltage gives a faster motor response. However, it is still necessary to limit current in the motor to the maximum rated value, in this case 1 amp. Simply applying 48 volts to a 5 ohm resistance in the coil would result in a current greater than 9 amps, which would burn out the stepper motor.

The solution most typically adopted is to use a current "chopper" to limit current through the motor to 1 amp. The appropriate transistors 32, 34, 36, 38 are switched on and off by the controller in order to limit current through the coil 12 to the maximum rated value. This switching causes the current to vary slightly, having an average value approximately equal to the current rating of the motor.

Three different controller modes are typically used to perform this current chopping. One approach is to switch the transistors in the H-bridge 16 at a constant frequency, and use a variable duty cycle in order to control the current. A second approach is to vary the switching frequency and have a constant off time for the transistors in the H-bridge. These techniques are usually referred to as pulse-width modulation (PWM), and frequency modulation (FM) respectively. Both of these techniques use the current sensing technique described in connection with FIG. 1. The constant frequency (PWM) technique adjusts the duty cycle in order to limit the coil current to the rated value, while the FM technique simply turns the current off for a fixed time whenever the current reaches the rated value. A third technique uses a fixed frequency and fixed duty cycle, and does not sense the current through the field coils. This technique is often referred to as open loop mode.

One side effect of the switching performed in the controller is the generation of an audible hum if the switching frequency is within those frequencies normally audible to the human ear. Since stepper motors are often used in machinery which operates near humans, the generation of audible sounds would be an irritant which it is important to prevent. In order to ensure that an audible hum is not generated, it is necessary to ensure that the effective switching frequency remains above approximately 20 kHz.

Since the frequency of FM switching varies according to variations in the load and other factors, fixed off time techniques are particularly susceptible to situations in which the switching frequency falls into the audible range. Current designs of FM controllers are not flexible enough to ensure both best operation of the motor/controller combination and the avoidance of generating audible frequency noise.

A problem which occurs with PWM and FM controllers relates to sensing of current through the sense resistor. It is common for noise spikes to be generated during switching, and these can be reflected as a transient current through the sense resistor. When this occurs, the detection circuitry within the controller is often fooled into detecting a high field coil current condition, so that the sensed current through the coil appears to be higher than it actually is. This results in the controller lowering the current through the coil, so that a lower than desired current is actually provided, and typically lowering the effective switching frequency in the coil to within the audible range. This occurs since the current in the coil follows an effective switching frequency of a subharmonic of the desired frequency.

It would be desirable to provide a controller suitable for use with stepper motors which can operate efficiently and flexibly in both an FM mode and an open loop mode. It would further be desirable to provide such a controller which is capable of having its operating parameters programmed by a microprocessor or controller. It would be further desirable to provide such a controller which is resistant to noise which can be reflected across the sense resistor.

SUMMARY OF THE INVENTION

It is therefore an object of the present invention to provide a controller suitable for use with stepper motors which has programmable parameters for operation under varying conditions.

It is another object of the present invention to provide such a controller which is resistant to switching noise.

It is a further object of the present invention to provide such a controller which can be selectably operated in either PWM or open loop mode.

Therefore, according to the present invention, a motor controller provides a digital monostable circuit which generates a control signal indicating whether a field coil within a motor should be turned on or off. Two registers are provided within the digital monostable to store values indicating a fixed off time and minimum on time. These registers can be loaded with selected values by a microprocessor or other controller. The stored values are selectively loaded into a counter which, when the field coil current reaches a preselected level, turns the supply to the field coil off for a time corresponding to the off time value, then on again for a period at least as long as the minimum on time value. The values in the off time and minimum on time registers can be changed to suit operating conditions of the system, and the controller can be operated in either PWM or open loop mode.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
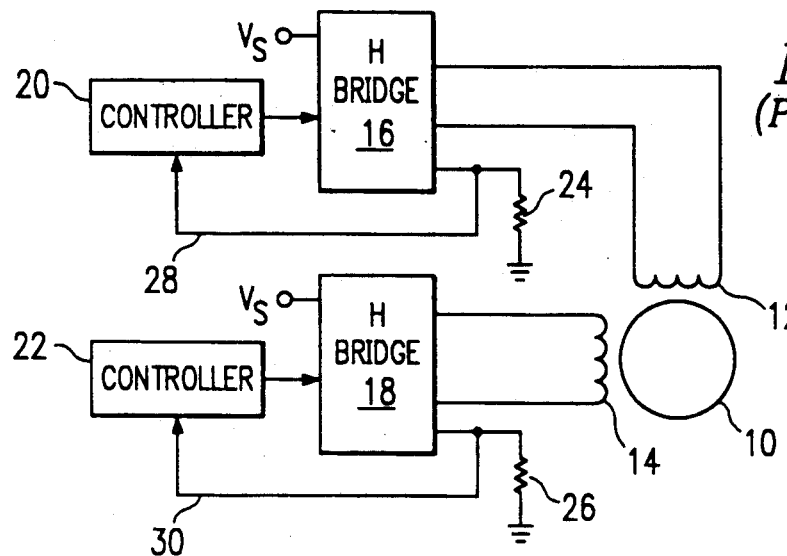
FIG. 1 is a block diagram representing a stepper motor and its associated prior art control circuitry.
Figure 2:
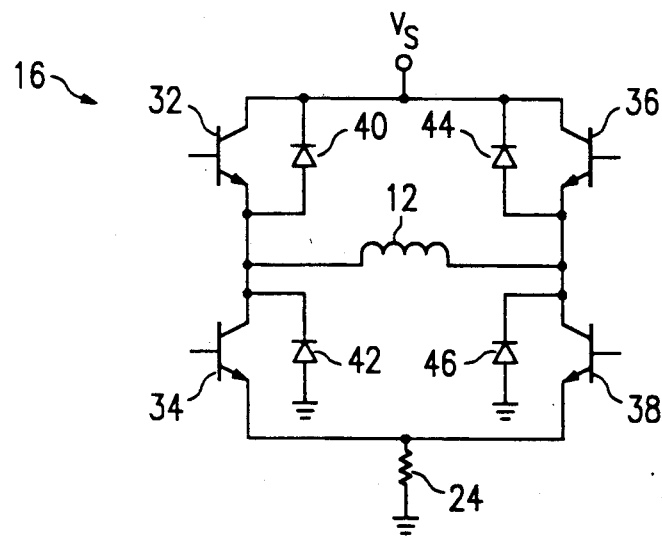
FIG. 2 is a schematic diagram of an H-bridge.
Figure 3:
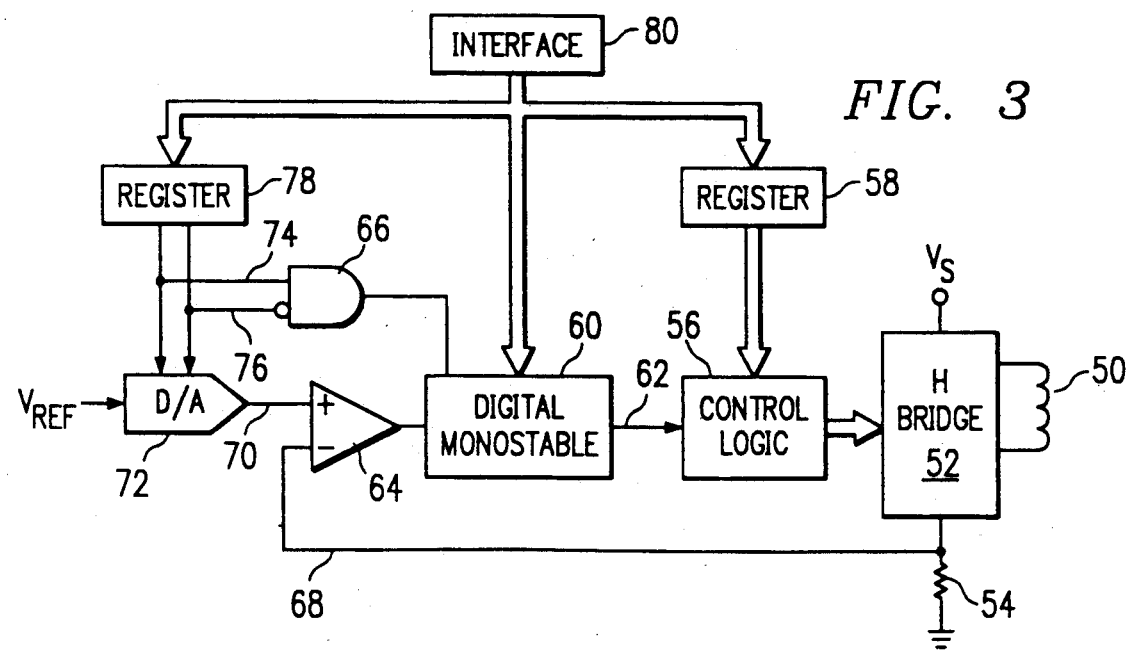
FIG. 3 is a block diagram of a motor controller according to the present invention.

A block diagram of a controller according to the present invention is shown in FIG. 3. The described controller illustrates operation of the control circuitry for a single field coil. As described in the background of the invention, stepper motors have two or more field coils, each of which would be controlled by a separate controller of the type shown in FIG. 3. As will be appreciated by those skilled in the art, a single controller such as shown in FIG. 3 can be used to provide current limiting in a standard DC motor.

Referring to FIG. 3, a field coil 50 is connected to an H-bridge 52. A voltage source $V_s$ provides power to excite the field coil 50 through the H-bridge 52. A current sense resistor 54 provides a low resistance in order to allow sensing of the current through the field coil 50.

Control logic 56 drives the transistor switches in the H-bridge 52 in order to control current flow through the field coil 50. Control logic 56 uses information contained in register 58 to determine the direction of current flow through the field coil 50, and to select whether fast or slow current decay is desired. As is known in the art, switching off all of the transistors in the H-bridge 52 provides for a faster current decay than is obtained when one of the upper transistors 32 or 36 remains on.

A control signal indicating whether the current through the field coil 50 should be turned on or off is generated by digital monostable circuitry 60 and connected to the control logic 56 through signal line 62. Details of operation of the digital monostable circuitry 60 will be described further in connection with FIGS. 4 and 5.

Voltage comparator 64 and logical gate 66 both provide inputs to the digital monostable circuitry 60. The comparator 64 has a signal line 68 connected to the sense resistor 54 to sense the current through the field coil 50 by measuring the voltage across the sense resistor 54. Signal line 70 is also connected to the comparator 64 from a digital-to-analog (D/A) converter 72. Signal lines 74 and 76 provide inputs to gate 66 which provides a logical AND function to the true value of the signal on line 74 and the complement value of the signal on line 76.

D/A circuitry 72 is used to generate a comparison reference signal on line 70 according to a value stored in register 78. The preferred embodiment uses a 2 bit D/A converter 72, but other resolutions may be used if desired. A reference voltage $V_{REF}$ supplies a reference voltage to operate the converter 72. The 2 bits held in the register 78 define four states, these states being 100%, 70%, LOW, and OFF. The 100% state indicates that the full rated current is to be applied to the field coil 50, while 70% indicates that only 70% of the full rated current is to be applied. As is known in the art, this 70% value, being equal to SQRT (2)/2, is used in the half step mode when both field coils are energized in order to provide a vector current sum having a value of approximately 100%. The LOW state corresponds to the hold, or detent, condition. Less current is needed to hold the motor stationary than to move it, and this value is typically set somewhere in the range of 20%-30% of the full rated current. The OFF state is used to indicate that current to the field coil 50 is to be turned off.

The state defined by a logical 1 on line 74 and a logical 0 on line 76, which causes the output of gate 66 to be a logical 1, corresponds to the detent state. This is used to indicate to the digital monostable circuitry 60 that operation in the open loop mode is to be used. This signal overrides the normal PWM functioning of the digital monostable circuit 60. Thus, open loop operation of the controller uses a low current through the coil 50.

An interface circuit 80 is used to supply data to the digital monostable 60 and registers 58, 78. As described above, two bits are supplied to register 78 in order to control the reference current value through the field coil 50. The same two bits are also supplied to register 58, to that the control logic 56 will turn off all transistor switches in the H-bridge 52 when the OFF state is defined. A third bit in register 58 is used to indicate the direction of current flow through the field coil 50 as is known in the art. The interface 80 is preferably compatible with control by a microprocessor or microcontroller which can supply data as described. The type of interface 80, for example a serial or parallel interface, does not form a part of the present invention, and is easily implemented by those skilled in the art.

Figure 4:
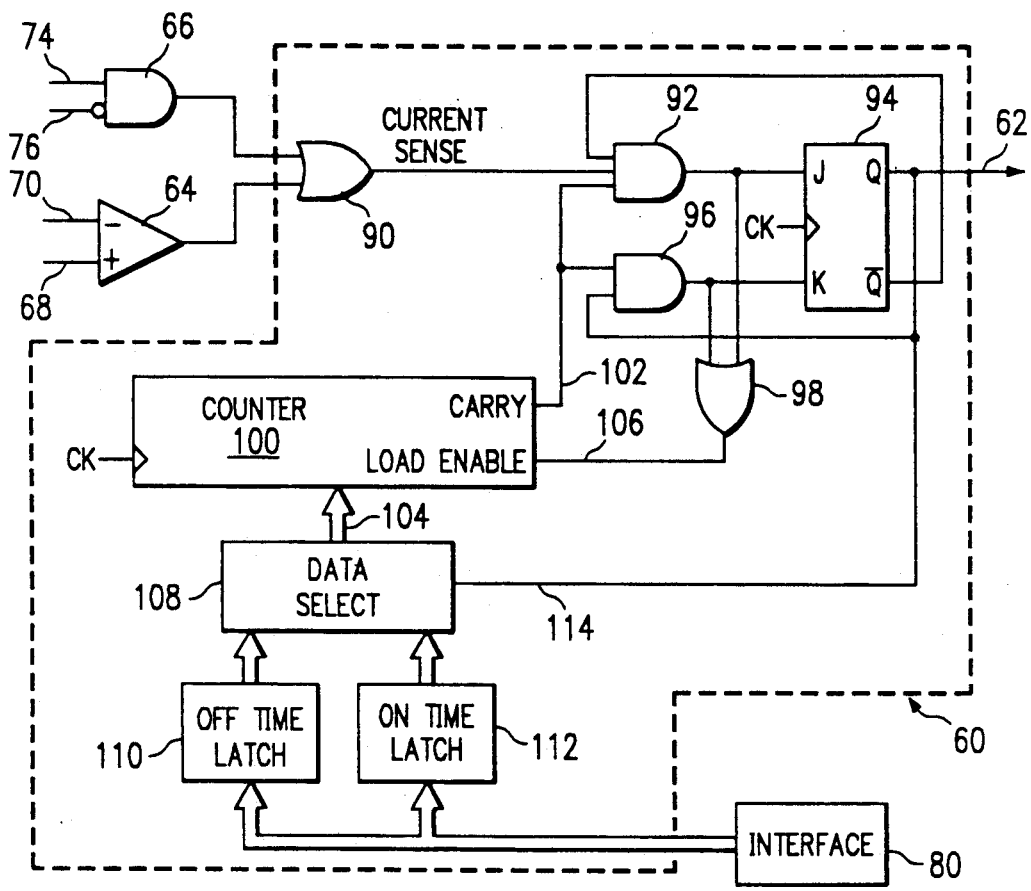
FIG. 4 is a schematic diagram of a digital monostable circuit suitable for use with the present invention.

Referring to FIG. 4, a detailed schematic diagram of the digital monostable circuit 60 is shown. The outputs of the AND gate 66 and comparator 64 are provided as inputs to OR gate 90, the output of which is, in turn, provided as one input into AND gate 92. The output from gate 90 defines the signal CURRENT SENSE, which indicates that the field coil 50 current is higher than the reference value when it has a logical value of 1. The Q output of a JK flip-flop 94 is provided as a second input into AND gate 92. Output Q of the flip-flop 94 is provided as an input into AND gate 96. The Q output also provides the control signal placed onto signal line 62. The outputs of AND gates 92, 96 are provided as the J and K inputs of the flip-flop 94, respectively. These values are also combined in OR gate 98. The flip-flop 94 is clocked by the clock signal CK.

A counter 100 is also clocked by signal CK, and counts down from a current value to 0. When the counter reaches 0, the value of a CARRY output 102 goes high. This output 102 is used as inputs to AND gates 92 and 96. When the counter 100 reaches 0, it stops counting and the CARRY output 102 remains high.

A value to be loaded into the counter 100 can be presented at preload inputs 104, and this value is latched into the counter 100 on the first clock edge after the value of a LOAD ENABLE input 106 is high (synchronous load). The counter 100 begins counting down from whatever value was latched into the counter 100 from the preload inputs 104. The LOAD ENABLE signal 106 is provided by the output of OR gate 98.

A data select circuit 108 provides a value to the preload input 104, with the value supplied being either that supplied by an off time latch 110 or an on time latch 112. In effect, the data select circuit 108 operates as a parallel multiplexer. The value presented to the preload input 104 is determined by the value of a control input 114 to the data select circuitry 108. The value supplied to the control input 114 is taken from the Q output of the flip-flop 94.

In order to operate the digital monostable 60, a fixed off time value is loaded into the off time latch 110 through the interface 80. A minimum on time value is loaded into the on time latch 112 through the interface 80. The appropriate values are also loaded into registers 58, 78 as described above. Once the initial operating parameters have been set by loading values into the latches 110, 112, control of current through the field coil 50 begins.

In general, the digital monostable 60 operates in an ON state, with the Q output of flip-flop 94 providing a logical 0 on signal line 62. This indicates that current is allowed to flow through the field coil 50. When current through the field coil 50 rises to the reference value, as indicated by the voltage across sense resistor 54, the output of the comparator 64 switches state from a logical 0 to a logical 1. As will be described connection with FIG. 5, this causes the monostable 60 output, represented by the flip-flop output Q, to switch to the OFF state (logical 1), and a delay ensues while the counter 100 counts clock cycles for a time determined by the value loaded into the off time latch 110. The counter then loads the value of the on time latch, and the output on line 62 switches back into the ON state (logical 0) for a period defined by the value stored in the on time latch 112. After this period of time, the digital monostable 60 reverts to its initial state.

Figure 5:
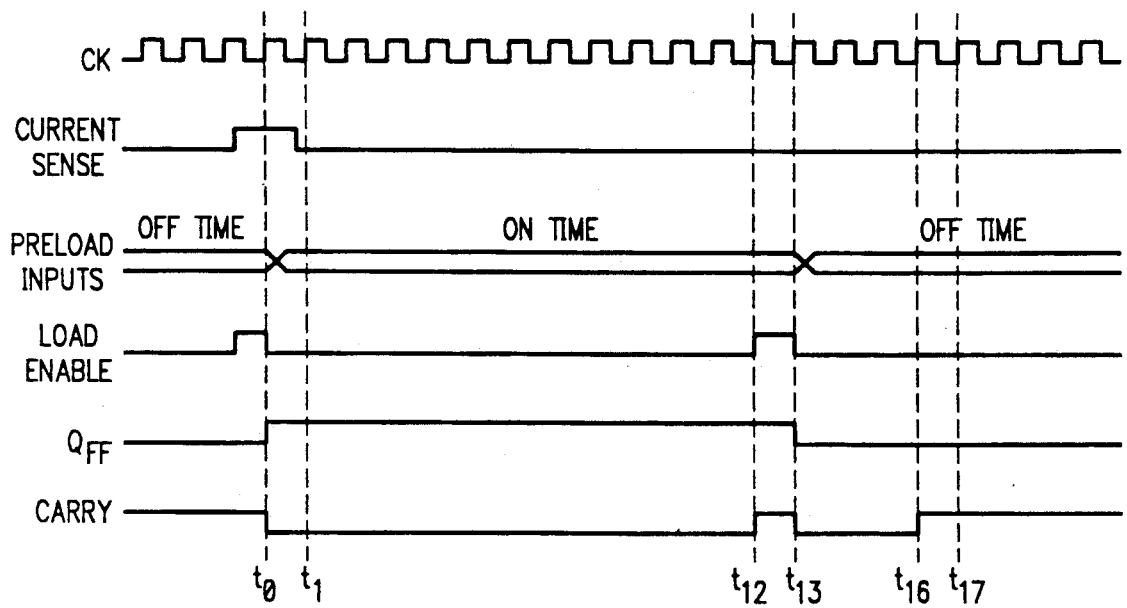
FIG. 5 is a timing diagram illustrating operation of the circuitry of FIG. 4.

The timing diagram of FIG. 5 illustrates operation of the digital monostable 60. For purposes of this illustration, an example is shown wherein the value loaded into the off time latch 110 is 12 and the value loaded into the on time latch 112 is 3.

Before time $t_0$, the output Q of the flip-flop 94 is low, indicating that the H-bridge 52 should be operated in the ON state. This value, also present on the control input 114, causes the value currently stored in the off time latch 110 to be presented to the preload inputs 104. As described above, the value on the counter 100 is 0, and the logical value out of the CARRY output 102 is 1.

As shown in FIG. 5, all transitions are made on the rising edge of the clock signal CK. The digital monostable 60 remains in the default state described above so long as the CURRENT SENSE signal is a logical 0.

As described above, when the voltage across the sense resistor 54 becomes higher than the reference level generated by the D/A converter 72, the comparator 64 generates a logical 1. This causes CURRENT SENSE to go high, as does the LOAD ENABLE signal. The next rising clock edge occurs at time $t_0$, at which time the flip-flop output Q goes high and the LOAD ENABLE signal returns low. Since a non-0 value has just been loaded into the counter 100, the CARRY output also goes low. Since the value Q has changed, the value at the control input 114 of data select circuit 108 changes, causing the value in the on time latch 112 to be presented to the preload inputs 104.

When Q goes high, the transistor switches in the H-bridge 52 are turned off, and current is no longer supplied to the field coil 50 by the power supply. The current through the coil 50 will decay according to the L/R time constant of whatever impedances exist in the system, so that the value at CURRENT SENSE will go low at some time after $t_0$. In FIG. 5, CURRENT SENSE is shown as going low between time $t_0$ and $t_1$, but this event may happen several clock cycles later.

Since the counter 100 was loaded with the value of the off time latch 110 at time $t_0$, it begins counting down from such value during the next clock cycle, which occurs at time $t_1$. For our example, the number 12 was contained in the off time latch 110, so the counter 100 continues to count down until it reaches 0 at time $t_{12}$. At this time, the CARRY signal goes high, which causes the output of AND gate 96 to go high. This, in turn, causes the LOAD ENABLE signal to go high. At this time, the contents of the on time latch 112 are presented to the preload inputs 104.

At time $t_{13}$, the value from the on time latch 112 is loaded into the counter 100, and the CARRY output goes low. This drives the LOAD ENABLE signal low, also. Since the output of gate 96 was a logical 1 for the previous clock cycle, the output of flip-flop 94 also goes low at time $T_{13}$, which causes the data select circuit 108 to switch and again present the contents of the off time latch 110 to the preload inputs 104.

As described above, for this example the content of the on time latch 112 was 3. Therefore, the counter 100 will count for three clock cycles before reaching 0. At time $t_{16}$, the CARRY signal goes high. Since CURRENT SENSE is low, no further state changes take place and the digital monostable 60 remains in its default state.

From the description above, it is seen that the digital monostable 60 operates in a fixed off time FM mode. Whenever the sensed current becomes high enough, the output on signal line 62 signals that the current supplied to the coil 50 is to be turned off for the fixed time defined by the value stored in the off time latch 110. The flip-flop 94 then switches back to its original state, and remains there for a time delay defined by the value in the on time latch 112. Until the counter 100 finishes counting the value stored in the on time latch 112, the value out of the sense comparator 64 has no effect on operation of the digital monostable circuitry 60. The effect of CURRENT SENSE going high cannot have an effect on the rest of the circuitry 60 until time $t_{17}$.

In order to operate the digital monostable 60 in open loop, or detent, mode, a logical 1 is presented on line 74 and a logical 0 on line 76. This causes the output of gate 66 to be a logical 1, forcing CURRENT SENSE to a logical 1 regardless of the output of comparator 64. Under these conditions, the circuitry 60 will operate exactly as described above between time $t_0$ and time $t_{17}$. However, at time $t_{17}$, the fact that CURRENT SENSE is high will immediately retrigger the sequence of events beginning again at time $t_0$. The cycle repeats continuously so long as the monostable 60 is operating in the detent mode. As will be recognized from the above description, one cycle delays occur each time the counter 100 reaches 0 before the next value is loaded through the preload input 104. Therefore, the period for the open loop control cycle is equal to 1 plus the value stored in the off time latch 110 plus 1 plus the value stored in the on time latch 112.

The inclusion in the control cycle of the minimum on time supplied by the value in the on time latch 112 helps prevent spurious triggering of the comparator 64 due to switching noise. Most switching noise will tend to occur immediately after the current through the coil is switched either on or off. When the current is switched off, the counter 100 is counting down from the value supplied in the off time latch 110, and spurious noise has no effect. Noise problems would normally cause spurious switching immediately after current was returned to the coil 50. However, with the enforced on time delay provided as described above, switching noise occurring during the minimum on time has no effect on operation of the digital monostable circuitry 60.

As will be appreciated by those skilled in the art, use of the latches 110 and 112 to store values representing the fixed off time and minimum on time allow the operating parameters of the control circuitry to be adjusted to fit various conditions found in the field. If the switching frequency should drop too low so as to fall into the audible range, the value stored in the off time latch 110 can be decreased. This will have the effect of increasing the switching frequency. The duty cycle to be used in the open loop mode is determined entirely by the relative values stored in the off time latch 110 and the minimum on time latch 112. By changing these values under computer control, nearly any desired frequency and duty cycle can be obtained.

The control circuitry described above, including the digital monostable circuitry, can be used to control stepper motors having any number of field coils. One control circuit as shown in FIG. 3 is used for each coil. The same control circuitry can be used to control other types of motors as well. For example, some stepper motors use field coils with a center tap connected to the power supply instead of an H-bridge for controlling current direction within the coils. PWM current control can still be used with such stepper motors, and the digital monostable described above can be used with the same advantages outlined above. By replacing the H-bridge with a single switch in series with the field coil, the same control circuitry can be used as a current controller for a standard DC motor.

While the invention has been particularly shown and described with reference to a preferred embodiment, it will be understood by those skilled in the art that various changes in form and detail may be made therein without departing from the spirit and scope of the invention.

What is claimed is:

1. A method for controlling current through a motor winding, comprising the steps of:
    sensing a current level through the motor winding;
    switching a winding current supply off for a selected first time period when a sensed winding current level reaches a preselected level;
    after the first time period, switching the current supply on;
    also after the first time period, inhibiting said sensing step for a selected second time period so that said switching the supply off step cannot occur, wherein said sensing step is resumed after the second time period expires; and
    continuously repeating said sensing, switching and inhibiting steps.

2. A method for controlling current through a motor winding, comprising the steps of:
    sensing a current level through the motor winding;
    switching a winding current supply off for a selected first time period when the winding current level reaches a preselected level;
    after the first time period, switching the current supply on for at least a selected second minimum time period;
    continuously repeating said sensing and switching steps; and upon receipt of a control signal indicating that operation should occur in a detent mode, forcing an indicator of sensed current level to a state which indicates that the winding current level is higher than the preselected level regardless of its actual value, whereby a next switching off step occurs immediately after each switching on step is completed.

3. The method of claim 2, wherein the first and second time periods are measured using a timer, and wherein numbers representing the time periods are changeably stored in registers accessed by the timer.

4. A system for controlling current through a motor winding, comprising:
- a sensor for sensing current flow through the winding;
- a comparator connected to said sensor for generating a first signal which indicates whether the current flow through the winding is greater than a preselected level;
- a timer for measuring first and second time periods of a preselected length;
- a control circuit connected to said timer and said comparator for, when the first signal is generated, generating a second signal for the first time period followed by a third signal for at least the second time period;
- means for switching a current supply to the motor winding in response to the second and third signals, wherein the supply is switched off when the second signal is generated and switched on when the third signal is generated; and
- means for selectably forcing the first signal to a level indicating that the current flow through the winding is greater than the preselected level regardless of its actual level, whereby said control circuit again generates the second control signal immediately after the second time period is completed.

5. A system for controlling current through a motor winding, comprising:
- a sensor for sensing current flow through the winding;
- a comparator connected to said sensor for generating a first signal which indicates whether the current flow through the winding is greater than a preselected level;
- first and second registers for retaining values corresponding to first and second time periods;
- a timer for measuring the first and second time periods of a preselected length;
- a control circuit connected to said timer and said comparator for, when the first signal is generated, generating a second signal for the first time period followed by a third signal for at least the second time period; and
- means for switching a current supply to the motor winding in response to the second and third signals, wherein the supply is switched off when the second signal is generated and switched on when the third signal is generated.

6. The system of claim 5, wherein said timer comprises:
- a counter, wherein said counter counts a number of clock cycles proportional to the value retained in said first register when the second signal is generated, and wherein said counter counts a number of clock cycles proportional to the value retained in said second register when the third signal is generated.

7. The system of claim 5, wherein the values in said first and second registers can be changed by a digital processor connected thereto.

8. A system for generating a control signal, comprising:
- a counter;
- first and second registers selectively connected to a preload input of said counter;
- a memory element;
- a register selector for selecting one of said registers to be connected to the preload input;
- an input signal having at least first and second states; and
- logic means for, when said input signal is in the first state, loading a first value from said first register into said counter, causing said counter to count from the loaded value to zero, and setting said memory element to a first state, and for, when said counter has reached zero, setting said memory element to the second state, loading a second value from said second register into said counter, and causing said counter to count from the second value to zero, wherein the state of said input signal is ignored until after said counter has counted to zero from the second value.

9. The system of claim 8, wherein said memory element comprises a JK flip-flop.

* * * * *